United States Patent Office 3,730,759
Patented May 1, 1973

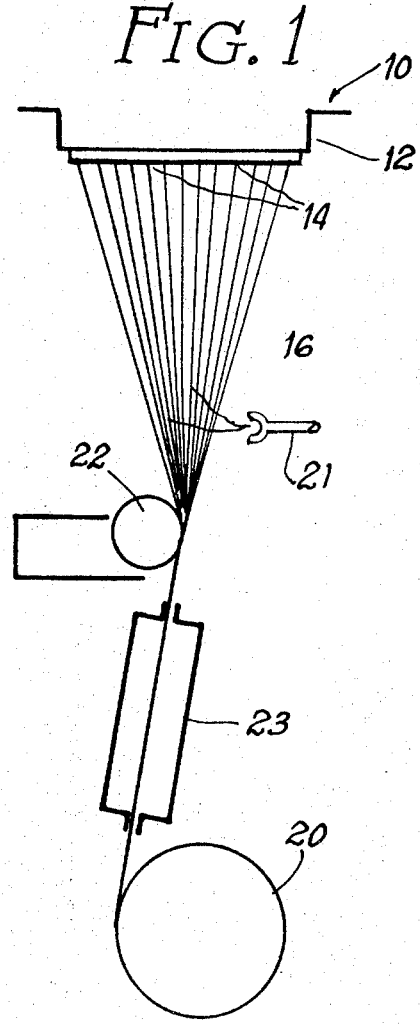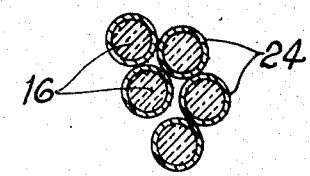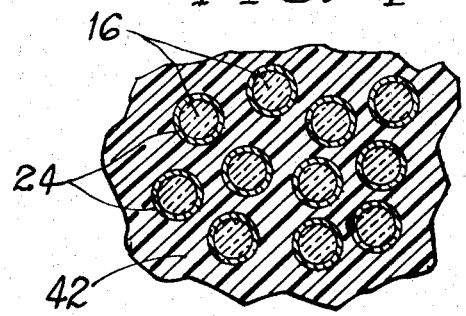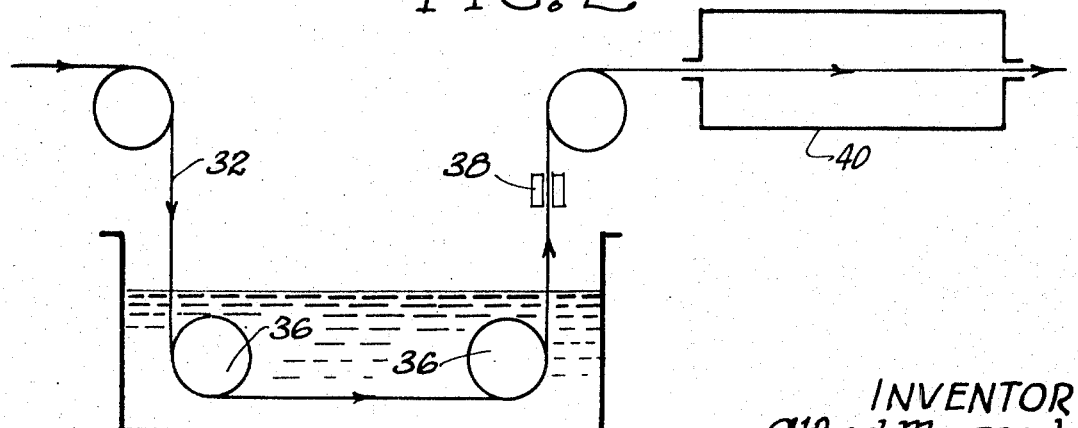

3,730,759
GLASS FIBER REINFORCED ELASTOMERS
Alfred Marzocchi, Cumberland, R.I., assignor to Owens-Corning Fiberglas Corporation
Filed Dec. 16, 1970, Ser. No. 98,642
Int. Cl. C03c 25/02
U.S. Cl. 117—72
26 Claims

ABSTRACT OF THE DISCLOSURE

This invention is addressed to the improvement in the bonding relationship between glass fibers and elastomeric materials in the manufacture of glass-fiber-elastomeric products wherein individual glass fibers are coated with a composition containing an anchoring agent in the form of a titanium orthoester or the reaction product of a titanium orthoester and an amine compound, or bundles of glass fibers are impregnated with a composition containing an elastomer compatible material and an anchoring agent in the form of the reaction product of a titanium orthoester and an amine compound.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized and unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymess in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combination with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

More specifically, it is an object of this invention to provide a method of treatment of glass fibers to improve the processing and the performance characteristics of the glass fibers as a reinforcement for elastomeric materials in the form of bundles, strands, yarns, cords and fabrics of glass fibers to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which:

FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIG. 2 is a flow diagram illustrating the treatment of glass fibers subsequent to their being formed into bundles, strands, yarns, cords or fabrics to impregnate the glass fiber bundles in accordance with the preferred practice of this invention;

FIG. 3 is a cross-sectional view of glass fibers processed in accordance with the diagram illustrated in FIG. 1; and FIG. 4 is a cross-sectional view of a bundle of glass fibers processed in accordance with the flow diagram of FIG. 2.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads have been made a represented by the practice of this invention, as will hereinafter be described.

The concepts of the present invention reside in the use of titanium compounds as glass fiber coupling agents for enhancing the bonding relationship between glass fibers and elastomeric materials in the manufacture of glass fiber reinforced elastomeric products. In accordance with the practice of the invention, the titanium compound coupling agents can be used in the form of the orthoester or in the form of the reaction product of an orthoester with an organic compound containing an amine group.

The following examples will serve to illustrate the principal concepts of the invention in a method and composition for the treatment of glass fibers to enhance the bonding relationship of glass fibers with elastomeric materials in the subsequent manufacture of glass fiber reinforced elastomeric products.

EXAMPLE 1

This example illustrates the use of tetrabutyl titanate for the treatment of glass fibers to form a thin coating thereon.

A treating composition is formulated as follows:

|  | Percent |
|---|---|
| Ethanol solvent | 90 |
| Tetrabutyl titanate | 10 |

The foregoing composition is preferably applied to individual glass fibers which have been wetted with water whereby adhesive forces between the glass fiber surfaces and the titanate coating are greatly enhanced. Without limiting the present invention as to theory, it is believed that the presence of moisture on the glass fiber surfaces promotes a chemical reaction between the weak acid, silicic acid, in glass and the ester groups of the titanium orthoesters. After the glass fibers have been coated with the orthoester, the coated fibers are preferably heated to an elevated temperature, such as a temperature within the range of about 80° C. and the boiling point of the particular orthoester employed, to further accelerate the reaction between the glass and the orthoester.

Any of a variety of methods can be employed for coating the glass fibers with the titanium orthoester, treating compositions, as the glass fibers are formed or subsequent to their formation. One suitable method for application of a suitable coating method for use in forming is illustrated in FIG. 1 of the drawing, in which glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating winding drum 20. The filaments 16 are first fogged with a minimum of water to wet the surfaces of the glass fibers by means of a spray 21, and are then coated with the heating composition of Example 1 as they are gathered together to form a strand. For this purpose, use can be made of an applicator 22 which is illustrated as a wiping pad which is constantly wet with the treating composition. Prior to being wound on winding drum 20, the strand of coated glass fibers is preferably heated by, for example, an oven 23 such as an air drying oven, to set the titanate coating on the glass fiber and to promote the reaction as described above. The titanate thus forms a very thin coating 24 (FIG. 2) on the surface of the glass fibers.

It will be understood by those skilled in the art that the titanate coating can be applied without first wetting the surfaces of the glass fibers or without subsequent heating of the coated fibers. It will be further understood that the titanate coating can be applied to the glass fibers subsequent to their formation. In this case, it is frequently unnecessary to wet the surfaces of the glass fibers with water because of the thin film of moisture which forms on glass fibers by reason of their hydrophilic surface characteristics is sufficient to promote the reaction which is believed to occur between the titanium orthoester and the glass.

A wide variety of titanium orthoesters can be used in lieu of the tetrabutyl titanate exemplified in Example 1. Representative of suitable orthoesters include compounds of the formula:

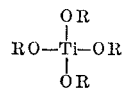

wherein R is alkyl containing 1–12 carbon atoms, such as methyl, ethyl, isopropyl, butyl, pentyl, etc; alkenyl containing 2–6 carbon atoms, such as vinyl, allyl, etc.; cycloalkyl containing 5–7 carbon atoms such as cyclopentyl, cyclohexyl, etc.; aryl containing 6–14 carbon atoms such as phenyl, naphthyl, etc.; aralkyl containing 7–15 carbon atoms, such as benzyl, etc.; alkaryl containing 7–15 carbon atoms, such as tolyl, etc. In addition, R can be substituted by one or more of amino, hydroxy, mercapto, etc. groups, as represented by gamma-aminopropyl, delta-aminobutyl, beta-hydroxyethyl, gamma-mercaptopropyl, 3-aminocyclohexyl, 4-mercaptocyclohexyl, p-aminophenyl, m-hydroxyphenyl, p-mercaptophenyl, etc.

Illustrative of the foregoing compounds are tetraisopropyl titanate, tetrabutyl titanate, tetravinyl titanate, tetrallyl titanate, tetracyclohexyl titanate, tetraphenyl titanate, tetrabenzyl titanate, tetra-(gamma-aminopropyl) titanate, tetra(delta-mercaptobutyl) titanate, tetra-(gamma-hydroxypropyl)titanate, tetra-(3 - aminocyclohexyl) titanate, tetra-(2-mercaptocyclopentyl) titanate, tetra-(p-aminophenyl) titanate, tetra-(m-hydroxyphenyl) titanate, tetra-(m-mercaptophenyl) titanate, tetra(p-aminobenzyl) titanate as well as a variety of others.

As is evident to those skilled in the art, the foregoing orthoesters can be prepared by methods known to the art, such as in accordance with the following equation:

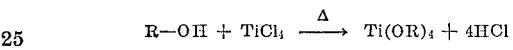

The reaction may be carried out at temperatures within the range of 50° to 200° C. in the presence of an inert solvent. Representative of the R—OH precursors include aliphatic and cycloaliphatic alcohols (e.g. isopropanol, butanol, cyclohexanol, vinyl alcohol, allyl alcohol), glycols (e.g. ethylene glycol, propylene glycol), alkanol amines (e.g., ethanol amine, propanol amine, butanol amine), mercaptoalkanols (e.g., 3 - mercaptopropanol), resorcinol, p-aminophenol, benzyl alcohol, etc.

The resulting orthoesters are unstable in water since they are relatively easy to hydrolyze. For this reason, they should be formulated into a treating composition in non-aqueous medium. For this purpose, use can be made of any of a variety of inert organic solvents such as aliphatic ketones and aldehydes (e.g. acetone, methylethyl ketone, diethyl ketone, acetaldehyde, propionaldehyde), their hydroxy-substituted derivatives such as diacetone alcohol, aliphatic alcohols (e.g., methanol, ethanol, isopropanol, etc.) and aliphatic and aromatic hydrocarbons such as benzene, toluene, xylene, hexane, pentane, etc.

Additional examples of this concept of the invention may be illustrated by the following:

EXAMPLE 2

Tetraallyl titanate, prepared by the reaction of allyl alcohol with titanium tetrachloride, is formulated into the following treating composition:

|  | Percent |
|---|---|
| Toluene | 80.0 |
| Tetraallyl titanate | 20.0 |

Application of the foregoing composition can be made in the manner described in Example 1 in an amount sufficient to provide a titanate coating consituting between 0.1 and 8% by weight of the treated glass fibers. For this purpose, use is generally made of a treating composition containing 5–30% by weight of the titanium compound coupling agent.

EXAMPLE 3

Tetra-(beta-mercaptoethyl)titanate, prepared by the reaction of mercaptoethanol with titanium tetrachloride, is formulated into the following composition:

|  | Percent |
|---|---|
| Tetra-(beta-mercaptoethyl)titanate | 15.0 |
| Diacetone | 85.0 |

EXAMPLE 4

Tetra-(gamma-aminopropyl)titanate, which can be prepared by the reaction of propanolamine with titanium tetrachloride, is formulated into the following composition:

| | Percent |
|---|---|
| Tetra-(gamma-aminopropyl)titanate | 15.0 |
| Diacetone | 85.0 |

EXAMPLE 5

Tetra-(m-hydroxyphenyl)titanate which can be prepared by the reaction of resorcinol with titanium tetrachloride, is formulated into the following:

| | Percent |
|---|---|
| Tetra-(m-hydroxyphenyl)titanate | 10.0 |
| Toluene | 90.0 |

EXAMPLE 6

Tetra-(2,4-dihydroxybenzyl)titanate is prepared by reacting 6-methylol resorcinol with titanium tetrachloride, and is formulated into the following treating composition:

| | Percent |
|---|---|
| Tetra-(2,4-dihydroxybenzyl)titanate | 10.0 |
| Toluene | 90.0 |

Application of the compositions of Examples 3 to 6 can be made in the manner described in reference to Example 1 to provide a thin titanate coating constituting between 0.1 and 8% by weight.

While the titanium orthoester treating compositions have been formulated in Examples 1 to 6 to include only an inert solvent, it will be understood by those skilled in the art that the treating compositions embodying the coupling agents of the present invention can be formulated to include any of the non-aqueous lubricants and/or film forming materials, as shown in the following examples.

EXAMPLE 7

| | Percent |
|---|---|
| Tetra-(2,4-dihydroxybenzyl)titanate | 10.0 |
| Vinyl alcohol-vinyl acetate copolymer (20/80) | 1.0 |
| Ethanol | 89.0 |

EXAMPLE 8

| | Percent |
|---|---|
| Tetraisopropyl titanate | 12.0 |
| Fatty acid amine (Nopcogen 16L) | 0.1 |
| Ethanol | 87.9 |

EXAMPLE 9

| | Percent |
|---|---|
| Tetra-(gamma-aminopropyl)titanate | 10.0 |
| Fatty acid amine (Nopcogen 16L) | .1 |
| Polyvinyl alcohol | 1.0 |
| Isopropanol | 88.9 |

Instead of the vinyl alcohol-vinyl acetate copolymer exemplified in Example 7, use can also be made of alcohol-soluble polyamides as the film forming component.

In accordance with another concept of the invention, use can be made of titanium compound coupling agents in the form of the reaction product of a titanium orthoester with an amine compound, such as ethylene diamine. Without limiting the present invention as to theory, it is believed that this reaction involves the substitution of one or more of the OR groups with a —NH— group.

The reaction is preferably carried out in a substantially anhydrous system to avoid decomposition of the orthoester reactant. For this purpose, use is preferably made of a reaction system formulated to include a substantially anhydrous inert solvent, such as anhydrous ether. The reaction will normally occur at room temperatures although slight heating of the reactants to accelerate the reaction is frequently desirable. As the orthoester, use can be made of any of the orthoesters

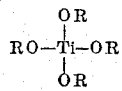

in which R is described above. Since generally the nature of the OR group is unrelated to the nature of the final product, it is frequently preferred to make use of orthoesters in which R is alkyl whereby the alkanol thus produced as a by-product can be easily removed by heating. The proportions of the reactants are not critical and can be varied within wide limits. For best results, use should be made of up to 4.5 moles of amine per mole of orthoester, and preferably 2 to 4 moles of amine per mole of orthoester.

A wide variety of the products produced by the reaction of titanium orthoesters with amines such as ethylene diamine are commercially available from the Ventrone Company.

The following examples will serve to illustrate this concept of the invention for forming a glass fiber treating composition which can be applied to individual glass fibers in forming or afterward in the manner described with reference to Example 1, except that it is unnecessary to wet the surfaces of the glass prior to application of the treating composition.

EXAMPLE 10

One mole of tetraethyl titanate is reacted with 4 moles of ethylene diamine in anhydrous diethyl ether at a temperature of about 30° C. Thereafter, the ether solvent and the ethanol are removed by heating in vacuo.

The resulting product is a highly viscous liquid which can be formulated into the following treating composition:

| | Percent |
|---|---|
| Orthoester-ethylene diamine reaction product | 5.0 |
| Water | 95.0 |

The foregoing composition can be applied to glass fibers by means of a wiping pad of the type illustrated in FIG. 1 to form individually coated glass fibers in which the coating constitutes between 0.1 to 8% by weight of the fiber system.

It will be understood that a wide variety of amine compounds can be used in forming the titanium compound coupling agents of this concept of the invention. Representative of suitable amines include the alkylene diamines containing 2–12 carbon atoms, such as ethylene diamine, propylene diamine, pentylene diamine, hexamethylene diamine, octamethylene diamine, etc.; polyalkylene polyamines containing up to 20 carbon atoms such as diethylene triamine, triethylene tetraamine, tetraethylene pentamine, etc.; alkanol amines containing 2–20 carbon atoms such as ethanolamine, propanol amine, hexanol amine, etc.; and amino silanes of the formula:

in which $n$ is an integer from 1 to 3, Z is a readily hydrolyzable group, such as halogen(chlorine, fluorine, bromine and iodine) or alkoxy containing 1–8 carbon atoms (e.g., methoxy, ethoxy, propoxy, etc.) and R is hydrogen or an organic group provided that at least one R group is an organic group containing at least one amine group.

Preferred amino silanes for use in accordance with the practice of the present invention are those of the formula

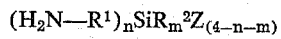

wherein Z and $n$ are as specified above, $m$ is an integer from 0 to 1, $R^1$ is a divalent organic radical including alkylene containing 1–12 carbon atoms such as methylene, ethylene, trimethylene, tetramethylene, hexamethylene, etc.; alkylene containing 2–8 carbon atoms, such as ethenylene, propenylene, butenylene, etc.; cycloalkylene containing 5–7 carbon atoms, such as cyclopentylene, cyclohexylene, etc.; arylene containing 6–10 carbon atoms such as phenylene, etc.; aralkylene containing 7–10 carbon atoms such as benzylene; alkarylene containing 7–10 carbon atoms such as methylenephenylene, etc.; and $R^2$ can be any organic group, and preferably alkyl containing 1–6 carbon atoms e.g., (methyl ethyl, propyl, etc.); alkenyl containing 2–6 carbon atoms (e.g., vinyl, allyl, etc.);

cycloalkyl containing 5–7 carbon atoms (e.g., cyclopentyl, cyclohexyl, etc.) or aryl containing 6–10 carbon atoms (e.g., phenyl, benzyl, etc.).

In addition to the foregoing amino silanes, the present invention also contemplates the use of polyamino silanes which are amino silanes having the above formula in which $R^1$ is $$—(CH_2)_x—NH—(CH_2)_y—,$$
$$—(CH_2)_x—NH—(CH_2)_y—NH—(CH_2)_z—,$$

or $$—(CH_2)_x—NH—(CH_2)_y—NH—(CH_2)_z—NH—(CH_2)_w—$$

wherein $w$, $x$, $y$ and $z$ are each integers from 2 to 4.

Representative of the foregoing amino silanes include the following: beta-aminoethyltrichloro silane, beta-aminoethylisopropyldichloro silane, gamma-aminopropyltriethoxy silane, gamma-aminopropylethyldimethoxy silane, gamma-aminopropylvinyldichloro silane, delta-aminobutyltrimethoxy silane, delta-aminobutylcylohexyldimethoxy silane, beta-aminovinyldichloro silane, beta-aminovinyldiethoxy silane, beta-aminovinylethyldimethoxy silane, gamma-aminoallyldimethoxy silane, 3-aminocyclohexyltrichloro silane, 3-aminocyclohexylethyldiethoxy silane, p-aminophenyltrimethoxy silane, p-aminobenzylethyldimethoxy silane, N(beta-aminoethyl)-gamma-aminopropyltrimethoxy silane, N'[N - beta - aminoethyl-beta-aminoethyl] - gamma-aminopropyltrimethoxy silane, bis-(gama-aminopropyl)dimethoxy silane, bis-[N-beta-aminoethyl - gamma-aminopropyl]dimethoxy silane, tris - beta - aminoethylmethoxy silane, bis-(beta-aminovinyl)dichloro silane as well as countless others.

It will be understood that the foregoing silanes can also be used in the form of the corresponding silanols and polysiloxane polymers.

Additional examples of this concept of the invention can be illustrated by reference to the following:

EXAMPLE 11

One mole of tetraethyl titanate is reacted without 4.2 moles of triethylene triamine in the manner described in Example 10. The product, after separation of the ether and ethanol, is a viscous liquid which is formulated into the following treating composition:

| | Percent |
|---|---|
| Titanium complex | 3.0 |
| Water | 97.0 |

Application of the foregoing composition to form a thin coating on glass fiber surfaces in the manner described in Example 10.

EXAMPLE 12

Tetraethyl titanate is reacted with ethanolamine in a mole ratio of 1:4 in the manner described in Example 10. The reaction product can be formulated into a treating composition of the type illustrated in Examples 10 and 11 for application to glass fibers to form a thin coating thereon.

EXAMPLE 13

This example illustrates the preparation of a silyl-containing titanium complex.

Tetraethyltitanate is reacted with gamma-aminopropyltriethoxy silane in a molar ratio of 1:4 under the conditions described in Example 10 to produce titanium complex which is thereafter formulated into the following treating composition:

| | Percent |
|---|---|
| Titanium complex | 2.0 |
| Water | 98.0 |

Application of the foregoing to glass fibers can be made in the manner described in Example 10 to provide a thin coating on the surfaces thereof constituting between 0.1 and 8% by weight of the glass fiber system.

EXAMPLE 14

Tetraethyl titanate is reacted with bis-(gamma-aminopropyl) diethoxy silane in the manner described in Example 10 to produce the corresponding complex which can be formulated into an aqueous treating composition of the type described in Example 13.

EXAMPLE 15

Tetraisopropyl titanate is reacted with N-(beta-aminoethyl)-gamma-aminopropyltriethoxy silane in the manner described. The resulting complex can be formulated into a treating composition for use with glass fibers as described in Example 13.

EXAMPLE 16

Tetraethyl titanate is reacted with delta-aminobutylvinyldiethoxy silane in accordance with the method described in Example 10 to produce a complex which can be formulated into the following treating composition for use with glass fibers.

| | Percent by wt. |
|---|---|
| Titanium complex | 3.0 |
| Fatty acid amine lauryltrimethylammonium hydroxide (Nopcogen 16L) | 0.1 |
| Water | 96.8 |

As illustrated by the foregoing examples, the treating compositions of this concept of the invention may be similarly formulated to include a glass fiber lubricant and/or a film former.

When using a titanium complex formed by the reaction of a titanium orthoester and an amino-silicon compound of the type described above, it is sometimes desirable to formulate the treating composition to include a tetraorgano ammonium hydroxide in order to promote the overall stability of the system by control of the pH on the alkaline side. For this purpose, use can be made of a tetraalkyl ammonium hydroxide such as tetramethyl ammonium hydroxide, tetraethyl ammonium hydroxide or lauryltrimethylammonium hydroxide, etc., in which the alkyl group each contains 1–14 carbon atoms, or tetraalkanol ammonium hydroxide, such as tetraethanol ammonium hydroxide, etc., in which the alkanol group contains 1–4 carbon atoms.

Such a formulation can be represented by the following example.

EXAMPLE 17

Treating composition

| | |
|---|---|
| Titanium complex of Example 15 | 2.0 |
| Tetraethanol ammonium hydroxide | 0.1 |
| Water | 97.9 |

Application of the foregoing composition can be made in the manner described in an amount sufficient to form on the glass fiber surfaces a coating constituting between 0.1 to 8.0% by weight of the coated glass fibers.

Glass fibers which have been treated in accordance with the concepts of the invention as described above in Examples 1 to 17 can be combined with an elastomeric material in the manufacture of glass fiber-reinforced elastomeric products whereby the thin coating on the glass fiber surfaces serves to intertie the individual glass fibers to the elastomeric material. For this purpose, use can be made of treated glass fibers in the form of continuous or discontinuous filaments, such as chopped glass fiber filaments.

It has been found according to the present invention, that chopped fibers which have been treated to form a thin coating of the titanium compound on the surfaces thereof are particularly beneficial in increasing the modulus of various elastomers, such as rubber. Without limiting the present invention as to theory, it is believed that the modulus of elastomers, such as natural rubber and the like, is at least in part determined by the existence of loops in the long chains of the rubber molecules. Thus, as the rubber is subjected to stress in tension, these loops are straightened whereby the limits of the modulus of the elastomer are reached. It is believed that the chopped fibers, when admixed with the elastomeric material, extend through the loops in the elastomer polymer chains to thereby prevent the described straightening effect of tensile forces acting upon the elastomeric material. Thus, it is believed that the chopped fibers serve to "jam" the polymer chain, and, consequently, serve much the same purpose as carbon black, a conventional additive for increasing the modulus of rubber.

In accordance with the practice of this concept of the invention, chopped glass fibers which have been treated in the manner described in Examples 1 to 17 are chopped in a conventional manner until the resulting chopped filaments have lengths within the range of 0.0004 to 0.50 inch, and then admixed with the elastomeric material to uniformly distribute the chopped fibers throughout the elastomeric material. The quantity of chopped fibers used for this purpose can be varied within wide ranges. For best results, use should be made of a quantity of chopped fibers constituting between .1 to 20% by weight of the elastomeric material, and preferably 1 to 10% by weight.

The titanium-containing coating on the glass fiber surfaces and the chopped fibers themselves act as accelerators during cure or vulcanization of the chopped fiber-elastomer system. In addition, it is believed that the tie-in between the coating on the glass fiber surfaces and the elastomeric material occurs during molding or cure under heat, or by vulcanization for advancement of the system to a cured or vulcanized stage in a conventional manner while in combination with short lengths of fibers containing the titanium-compound coating.

The resulting elastomeric material has significantly improved properties for use in conveyor belts, and tread and sidewall portions of pneumatic tires, including improved scuff and cut resistance, heat resistance and shock resistance.

This concept of the invention can be illustrated by the following example.

EXAMPLE 18

Natural rubber is milled for about 10 minutes and then glass fibers which have been treated in the manner described in Example 10 cut or chopped to maximum lengths of 0.3 inch are added in an amount sufficient to provide a mixture containing 6% by weight.

The resulting elastomeric mixture is then molded in a conventional manner at a temperature of about 250° F.

In accordance with another concept of the present invention, it is possible and sometimes desirable to formulate the anchoring agent of this invention formed by the reaction of a titanium orthoester and an amine compound as described above into a composition containing an elastomer compatible material for treatment of bundles of glass fibers by impregnation. In accordance with this concept of the invention, glass fibers are preferably, although not necessarily, sized in forming with a conventional glass fiber size composition, and preferably one which contains an amino silane anchoring agent, of the type described in U.S. Pat. No. 3,424,608, whereby the glass fibers are sized as they are gathered together to form a strand.

After the fibers have been processed into strands, yarns, cords or fabrics, hereinafter referred to generally as bundles, the bundles of treated glass fibers can be impregnated in accordance with this concept of the invention with any of a variety of impregnants, as represented by the following examples.

EXAMPLE 19

Impregnating composition

| | Percent by wt. |
|---|---|
| Natural rubber latex-resorcinol formaldehyde resin (38% solids) "Lotol 5440" | 30.0 |
| Water | 70.0 |

Impregnation with the aqueous composition of Example 19 can be made by conventional means for impregnation, such as by immersion of the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 19. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time, ranging from 1 to 30 minutes, depending somewhat upon the temperature of drying. It will be understood that, if desired, use can also be made of dielectric treatment to coagulate the latex with little or no drying.

Suitable resorcinol aldehyde resins and combinations thereof with natural rubber latex are marketed by the U.S. Rubber Company under the tradename "Lotol 5440." For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

It is generally preferred to formulate the impregnating composition to include a quantity of the elastomer compatible impregnant sufficient to provide a solids content within the range of 10-50% by weight. Application should be made in an amount sufficient to deposit in the glass fiber bundle dry solids constituting 5-25% by weight, and preferably 10-15% by weight.

Instead of combinations of a resorcinol aldehyde resin and an elastomer latex, use can be made of a variety of elastomer compatible impregnants as represented by the following examples of impregnating compositions. For example, use can be made of a vinyl pyridine-butadiene-styrene terpolymer impregnating composition of the type described in U.S. Pat. No. 3,424,608, which can be formulated as follows:

EXAMPLE 20

Impregnating composition

| | Parts by wt. |
|---|---|
| Resorcinol formaldehyde resin | 2–10 |
| Formaldehyde (37% solution) | 1–3 |
| Conc. NH$_4$OH | 2–5 |
| Vinyl pyridine - butadiene - styrene terpolymer (Gentac–42% solids) | 15–50 |
| Neoprene rubber latex (50% solids) | 25–50 |
| Polybutadiene latex (60% solids) | 5–15 |
| Alkali metal hydroxide | .05–.02 |

Water is incorporated into the following materials in amounts sufficient to provide an impregnating composition having a solids content within the range of 10–50% solids by weight.

The vinyl pyridine terpolymer is a terpolymer of about 15 parts by weight vinyl pyridine, 70 parts by weight butadiene and 15 parts by weight styrene, and is commercially available from the General Tire & Rubber Company under the trademark "Gentac" or the Goodrich Tire Company under the trademark "Goodrite VP 100." It will be understood by those skilled in the art that use can be made of the vinyl pyridine terpolymer alone as the impregnant in aqueous suspension.

If desired, use can also be made of an elastomer impregnant, preferably in the form of a latex in aqueous medium, in lieu of elastomer compatible impregnants of the type described in Examples 18 and 19, as represented by the following example:

EXAMPLE 20

Impregnating composition

| | Percent by wt. |
|---|---|
| Natural rubber latex (50% solids) | 30.0 |
| Water | 70.0 |

If desired, the elastomer impregnating composition can also be formulated to include one or more conventional vulcanizing agents, such as sulfur, monochloride, selenium, tellurium, thiuram disulfides, polysulfide polymers, zinc oxide, magnesium oxide, organic peroxides as well as a variety of others. The vulcanizing agent may be employed in amounts up to about 15% by weight of the latex.

It will also be understood by those skilled in the art that a wide variety of other elastomers can be used in place of natural rubber as described in Example 20, include neoprene rubber, isobutyl rubber, butadiene-styrene rubber, etc., either with or without one or more of the vulcanizing agents described above.

In accordance with yet another concept of the invention, the titanium-containing coupling agents of the present invention prepared by the reaction of a titanium orthoester with an amine can be used in combination with the impregnating compositions of Examples 18 to 20 for application to glass fibers which preferably, but not necessarily, have been sized in forming with a conventional glass fiber size composition of the type described in the aforesaid U.S. patent. This concept of the invention may be represented by the following examples.

EXAMPLE 21

Impregnating composition

| | Percent by wt. |
|---|---|
| Naturar rubber latex-resorcinol formaldehyde resin (38% solids) "Lotol 5440" | 30.0 |
| Reaction product of tetraethyl titanate and ethylene diamine of Example 10 | 2.0 |
| Water | 68.0 |

Glass fibers, which have been sized in forming with the size of Example 1 of U.S. Pat. 3,424,608, are impregnated with the above composition in the manner described with reference to Example 18 to deposit dry solids constituting 5–25% by weight of the fiber system.

Other impregnating compositions which can be used in accordance with this concept are as follows:

EXAMPLE 22

Impregnating composition

| | Percent by wt. |
|---|---|
| Natural rubber latex-resorcinol formaldehyde resin (38% solids) "Lotol 5440" | 27.0 |
| Reaction product of tetraethyl titanate with gamma-aminopropyltriethoxy silane of Example 13 | 1.5 |
| Tetraethanol ammonium hydroxide | 0.5 |
| Water | 71.0 |

EXAMPLE 23

Impregnating composition

| | Percent by wt. |
|---|---|
| Vinyl pyridine-butadiene-styrene terpolymer | 30.0 |
| Reaction product of tetraethyl titanate with ethanol amine | 1.0 |
| Water | 69.0 |

EXAMPLE 24

Impregnating composition

| | Percent by wt. |
|---|---|
| Neoprene rubber latex (55% solids) | 30.0 |
| Reaction product of tetraethyl titanate with bis-(gamma-aminopropyl)dimethoxy silane | 1.5 |
| Tetramethyl ammonium hydroxide | 0.5 |
| Water | 68.0 |

In general, the foregoing impregnating compositions of Examples 21 to 24 are formulated to include between .1 to 5% by weight of the coupling agents of the invention.

It will be understood that the glass fibers can first be individually coated with one of the treating compositions described in Examples 1–17, and then impregnated with one of the compositions described in Examples 21 to 24.

It is desirable to achieve as full impregnation as possible into the bundles of glass fibers in order to more effectively separate the fibers one from the other by the impregnating material since the solids are effective as a coating on the individually coated glass fibers to cushion the fibers and to protect the fibers against destruction. Thus, it is desirable to achieve as deep a penetration as possible with the impregnating composition into the glass fiber bundle. The deeper the penetration, the more effective will be the bond between the glass fibers in the bundle and the elastomeric material with which the bundles of glass fibers are combined in the subsequent manufacture of glass fiber reinforced elastomeric products.

A bundle of impregnated fibers is illustrated in FIG. 4 of the drawing, and includes a plurality of glass fibers 16 which each have a thin coating 24 on the surfaces thereof containing either one of the titanium-containing coupling agent of the invention or a conventional size composition as described. The individual fibers are formed into a bundle by the impregnant 42 which serves, as indicated above, to separate the fibers each from the other.

In fabricating the combinations of the glass fibers treated in accordance with the practice of the invention, with elastomeric materials, the glass fibers of bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber reinforced elastomeric product.

It will be apparent that I have provided a new and improved coupling agent which can be used in the treatment of glass fibers to enhance their integration with elastomeric materials in the manufacture of glass fiber elastomeric products.

It will be understood that various changes and modifications can be made in the details of formulation, procedure, method of application or use without departing from the spirit of the invention, especially as defined in the following claims.

What is claimed is:
1. Glass fibers having a thin coating thereon, said coating containing the reaction product of (1) a titanium compound having the formula

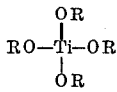

wherein R is selected from the group consisting of alkyl, alkenyl, cycloalkyl, aryl, aralkyl, alkaryl and substituted derivatives thereof and (2) an amino silane of the formula $$R_n^1SiZ_{(4-n)}$$

wherein Z is a readily hydrolyzable group, n is an integer from 1 to 3 and $R^1$ is an organic group or hydrogen, provided that at least one $R^1$ group be an organic group substituted by at least one amino group.

2. Glass fibers as defined in claim 1 wherein said coating constitutes between 0.1 to 8% by weight of the coated fibers.

3. Glass fibers as defined in claim 1 wherein R is substituted by at least one group selected from the group consisting of an amino group, a hydroxy group and a mercapto group.

4. Glass fibers as defined in claim 1 wherein said coating also contains a material selected from the group consisting of a film-forming material, a glass fiber lubricant and mixtures thereof.

5. Glass fibers as defined in claim 1 wherein said amino silane is a silane having the formula:

$$(H_2N-R^2)_nSi(R_m^3)Z_{(4-n-m)}$$

wherein n and Z are as set forth above, m is an integer from 0 to 1, $R^2$ is a divalent organic radical and $R^3$ is a monovalent organic radical.

6. Glass fibers as defined in claim 1 wherein the amino silane is reacted with the orthoester in a molar ratio of up to 4.5 moles of amine per mole of orthoester.

7. A glass fiber bundle comprising a plurality of glass fibers and an impregnant therein, said impregnant comprising a polymeric material comprising a mixture of an elastomer and a resorcinol-aldehyde resin, and a coupling agent formed by the reaction of a titanium ortho-ester of the formula:

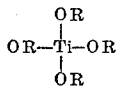

wherein R is selected from the group consisting of alkyl, alkenyl, cycloalkyl, aryl, aralkyl, alkaryl and substituted derivatives thereof with an amino silane of the formula $$R_n^1SiZ_{(4-n)}$$

wherein Z is a readily hydrolyzable group, n is an integer from 1 to 3 and $R^1$ is an organic group or hydrogen, provided that at least one $R^1$ group be an organic group substituted by at least one amino group.

8. A glass fiber bundle as defined in claim 7 wherein said amino silane is a silane having the formula:

$$(H_2N-R^2)_nSi(R_m^3)Z_{(4-n-m)}$$

wherein n and Z are as set forth above, m is an integer from 0 to 1, $R^2$ is a divalent organic radical and $R^3$ is a monovalent organic radical.

9. A glass fiber bundle as defined in claim 7 wherein the amino silane is reacted with the orthoester in a molar ratio of up to 4.5 moles of amine per mole of orthoester.

10. A glass fiber bundle as defined in claim 7 wherein the individual glass fibers in the bundle have a thin coating thereon, said coating containing a titanium compound selected from the group consisting of an orthoester of the formula:

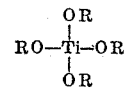

wherein R is as set forth above.

11. A glass fiber bundle as defined in claim 10 wherein said coating also contains a material selected from the group consisting of a film-forming material, a glass fiber lubricant and mixtures thereof.

12. A glass fiber bundle as defined in claim 10 wherein said coating constitutes .1 to 8% by weight of the coated glass fibers.

13. A glass fiber bundle as defined in claim 7 wherein said impregnant constitutes between 5-25% by weight of the bundle.

14. A glass fiber bundle as defined in claim 7 wherein the individual glass fibers include a thin size coating on the surfaces thereof.

15. A glass fiber bundle comprising a plurality of individual glass fibers having a thin coating thereon, said coating comprising a titanium compound selected from the group consisting of the reaction product of an orthoester having the formula

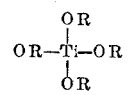

wherein R is selected from the group consisting of alkyl, alkenyl, cycloalkyl, aryl, aralkyl, alkaryl and substituted derivatives thereof and an amino silane of the formula $$R_n^1SiZ_{(4-n)}$$

wherein Z is a readily hydrolyzable group, n is an integer from 1 to 3 and $R^1$ is an organic group or hydrogen, provided that at least one $R^1$ group be an organic group substituted by at least one amino group, and an impregnant in the bundle, said impregnant comprising a blend of an elastomer and a resorcinol-aldehyde resin.

16. A glass fiber bundle as defined in claim 15 wherein said coating constitutes between 0.1 and 8% by weight of the coated fibers.

17. A glass fiber bundle as defined in claim 15 wherein R is substituted by at least one group selected from the group consisting of an amino group, a hydroxy group and a mercapto group.

18. A glass fiber bundle as defined in claim 15 wherein said coating also contains a material selected from the group consisting of a film-forming material, a glass fiber lubricant and mixtures thereof.

19. A glass fiber bundle as defined in claim 15 wherein said amino silane is a silane having the formula:

$$(H_2N-R^2)_nSi(R_m^3)Z_{(4-n-m)}$$

wherein n and Z are as set forth above, m is an integer from 0 to 1, $R^2$ is a divalent organic radical and $R^3$ is a monovalent organic radical.

20. A glass fiber bundle as defined in claim 15 wherein the amine compound is reacted with the orthoester in a molar ratio of up to 4.5 moles of amine per mole of orthoester.

21. A glass fiber bundle as defined in claim 15 wherein said impregnant constitutes between 5-25% by weight of the bundle.

22. In a glass fiber reinforced elastomeric product in which an elastomeric material constitutes a continuous phase in which the glass fibers are distributed, the improvement comprising glass fibers having a coating thereon, said coating containing a titanium compound in the form of the reaction product of (1) an orthoester having the formula:

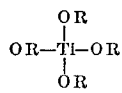

wherein R is selected from the group consisting of alkyl, alkenyl, cycloalkyl, aryl, aralkyl, alkaryl and substituted derivatives thereon and (2) an amino silane having the formula:

wherein Z is a readily hydrolyzable group, $n$ is an integer from 1 to 3 and $R^1$ is an organic group or hydrogen, provided that at least one $R^1$ group be an organic group substituted by at least one amino group.

23. A product as defined in claim 22 wherein the glass fibers are in the form of chopped fibers having short lengths.

24. A product as defined in claim 23 wherein the chopped fibers constitute between .1 and 20% by weight of the elastomeric material.

25. A product as defined in claim 22 wherein the glass fibers are in the form of a bundle and the bundle includes an impregnant comprising a mixture of an elastomer and a resorcinol-aldehyde resin.

26. In a glass fiber-reinforced elastomeric product in which an elastomeric material constitutes a continuous phase in which the glass fibers are distributed, the improvement in the bonding relationship between the glass fibers and the elastomeric material constituting the continuous phase comprising a bundle of glass fibers distributed throughout the elastomeric material, each of the glass fibers forming the bundle having a thin coating on the surfaces thereof comprising the reaction product of an ortho-ester having the formula:

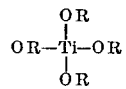

wherein R is selected from the group consisting of alkyl, alkenyl, cycloalkyl, aryl, aralkyl, alkaryl and substituted derivatives thereof and an amino silane of the formula

wherein Z is a readily hydrolyzable group, $n$ is an integer from 1 to 3 and $R^1$ is an organic group or hydrogen, provided that at least one $R^1$ group be an organic group substituted by at least one amino group, and an impregnant in the bundle, said impregnant comprising a mixture of a resorcinol-aldehyde resin and an elastomer.

References Cited

UNITED STATES PATENTS

| | | | |
|---|---|---|---|
| 2,938,812 | 5/1960 | Marzocchi et al. | 117—124 T |
| 2,943,955 | 7/1960 | Brill | 117—124 T |
| 2,798,909 | 10/1956 | Haslam | 117—124 T |
| 3,337,391 | 8/1967 | Clayton et al. | 260—429.5 |
| 3,252,278 | 5/1966 | Marzocchi et al. | 117—126 G S |
| 3,367,793 | 2/1968 | Atwell | 117—126 G S |
| 3,391,052 | 7/1968 | Marzocchi | 117—126 G N |

WILLIAM D. MARTIN, Primary Examiner

D. COHEN, Assistant Examiner

U.S. Cl. X.R.

117—126 GN, GQ, GB; 260—429.5